E. E. SHEAR AND W. G. WAECHTLER.
RAILROAD SAFETY APPLIANCE.
APPLICATION FILED JUNE 13, 1919.
1,393,173. Patented Oct. 11, 1921.
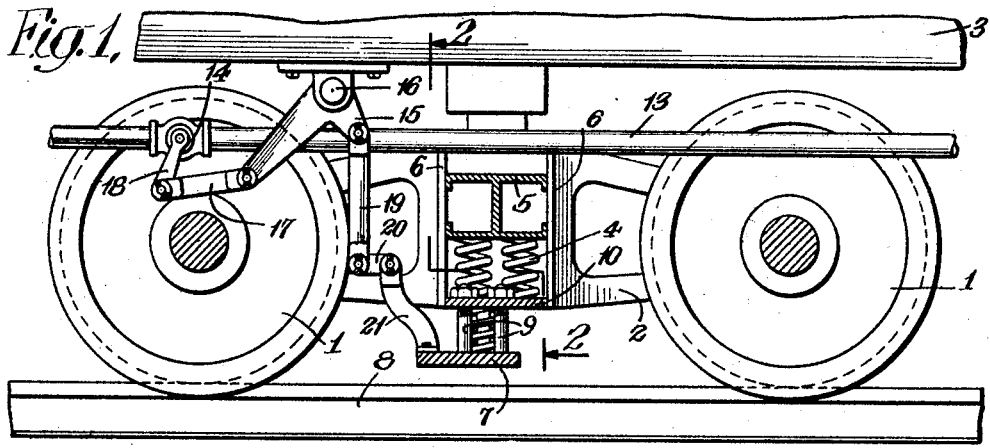
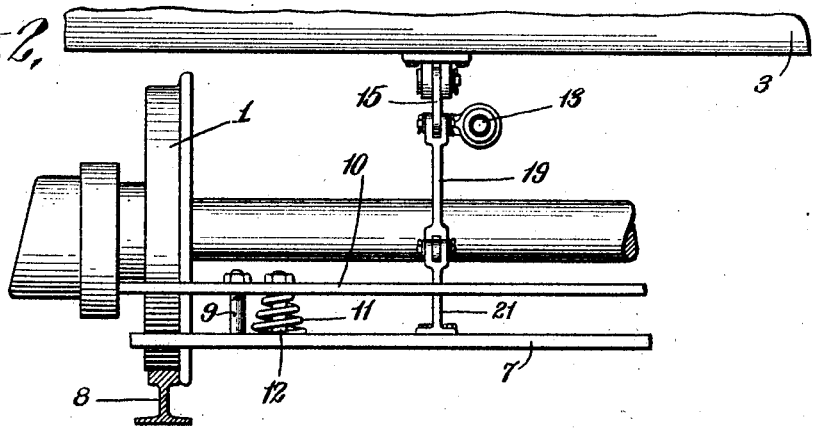
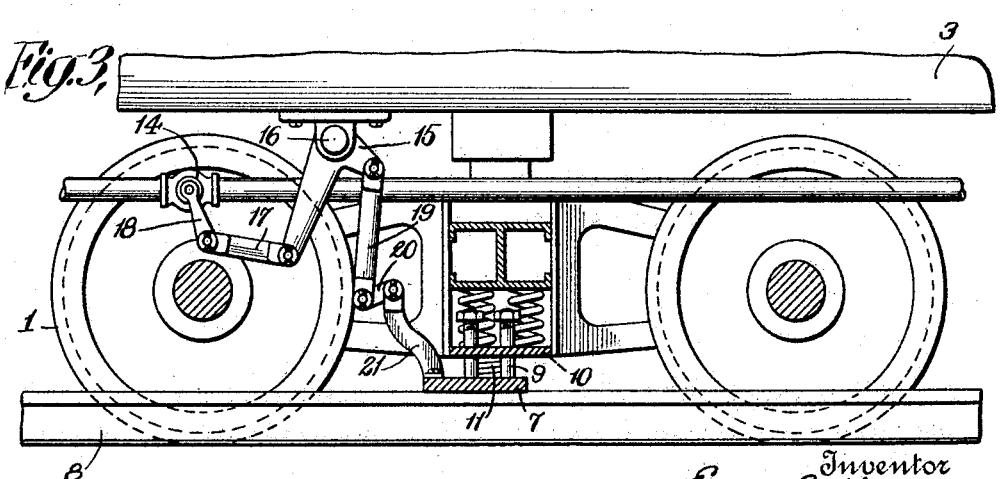
Inventor
Edward E. Shear
William G. Waechtler
By their Attorney

UNITED STATES PATENT OFFICE.

EDWARD E. SHEAR AND WILLIAM G. WAECHTLER, OF KINGSTON, NEW YORK; SAID WAECHTLER ASSIGNOR TO SAID SHEAR.

RAILROAD SAFETY APPLIANCE.

1,393,173.   Specification of Letters Patent.   Patented Oct. 11, 1921.

Application filed June 13, 1919. Serial No. 304,076.

*To all whom it may concern:*

Be it known that we, EDWARD E. SHEAR and WILLIAM G. WAECHTLER, both citizens of the United States, and residing at Kingston, in the county of Ulster and State of New York, have invented certain new and useful Improvements in Railroad Safety Appliances, of which the following is a specification.

Our invention relates to improvements in safety devices which are applied when a railway car truck in a train runs off the track or breaks. Numerous serious accidents have taken place on account of trucks being derailed or broken and dragging along the track without the knowledge of the engineer or other members of the train crew, until the derailment or breaking of the truck has resulted in the derailment or wrecking of the train.

Our invention provides means whereby the derailment of a truck or breakage of the same, results automatically in the movement of a valve in the train air pipe whereby the brakes are applied throughout the train. The movement of the valve may readily be regulated to apply the brakes more or less gradually. Or, if desired, the movement of the valve in the air pipe, or other device operated by the mechanism referred to, may be used for actuating a signal or alarm device in the engine cab, so that the engineer will be warned to apply his brakes. Preferably we provide a shoe beneath each truck, which normally is mounted at a suitable height above the rails, but which is brought into engagement with one or both of the rails, if the wheels of the truck run off the rails, or if the body of the truck breaks. The consequent upward movement of the shoe, relative to the truck body, is utilized for the operation of the brake setting or signaling devices referred to. In the preferred form of our device the cars of the train, which rest on springs mounted on the trucks, each carry a member which is oscillated by the upward movement of the shoe referred to, and thereby causes the operation of a valve in the air line. In this preferred device also, connections are made between the pivoted member mentioned and the shoe, such that the up-and-downmovement of the car on its supporting springs is taken up in the connections without altering the normal positions of the shoe or of the member pivoted to the car.

In order that our invention may be more clearly understood, attention is hereby called to the accompanying drawings forming part of this application and illustrating one embodiment of our invention. In the drawings Figure 1 represents a side elevation of a car truck and accompanying parts, with our safety devices applied thereto, certain parts being shown in cross section; Fig. 2 is a cross sectional view taken on line 2—2 of Fig. 1; and Fig. 3 is a view similar to that shown in Fig. 1, with the truck derailed and the safety devices operated.

Referring to the drawings the car truck indicated, which may be of any standard or desired form, is provided with the wheels 1 and the body 2. A portion of a car 3 is indicated as mounted above the truck. In the form illustrated each truck is provided with springs 4 on which is supported a member 5 which has up-and-down motion between guides 6, 6, and forms a support for the car body 3.

The shoe 7 may take the form of a metal bar suspended below the truck body and extending slightly over each of the rails 8 on which the wheels 1 run. The shoe 7 may be suspended by means of bolts, such as those shown at 9 from the lower cross member 10 of the truck body, the bolts being mounted to slide through suitable openings in the member 10, and being provided at their upper ends with nuts or heads by which the shoe is suspended. The shoe is preferably pressed downwardly into its lower or normal position by means of a spring or springs, such as that shown at 11, which is shown as coiled about a bolt 12 mounted in the shoe 7 and slidably extending through the cross member 10.

The usual train air pipe is indicated at 13, this pipe being provided adjacent each car truck with a valve 14. In the normal position of the parts the valves 14 are closed, and on the opening of any one of the same the brakes may be applied throughout the train in well known manner. Or, as stated, the total or partial operation of the valves 14 may, if desired, be utilized for effecting a desired form of signal or alarm in the engineer cab or elsewhere in the train.

A bell-crank lever 15 is shown as pivoted at 16 to the car body 3, one of these bell-cranks being thus mounted in relation to each car truck. The longer arm of the bell-crank is connected by a link 17 with an arm 18, the oscillation of which from the position shown in Fig. 1 to the position shown in Fig. 3 results in the operation of valve 14.

The shorter arm of bell-crank 15 is connected by a link 19 to a short link 20, the opposite end of which is pivotally connected to a bracket 21 rigidly mounted on the shoe 7.

When the wheels 1 are running on the rails 8, and the train is in normal operation, the various shoes 7 underneath the trucks 2 are suspended a suitable short distance above the rails. As the car bodies rise and fall slightly on the springs 4 of the trucks, the links 19 will accordingly rise and fall. This causes merely a slight oscillation of the links 20 about their connections with brackets 21, the positions of shoes 7 and bell cranks 15 not being affected. The bell-cranks 15 may, of course, be so mounted that a definite amount of pressure will be required to oscillate the same.

When the wheels run off the tracks, as is shown in Fig. 3, or if the truck bodies should break for any reason, the shoes 7 are brought into engagement with one or both of the rails 8 and are forced upwardly relatively to the car trucks, against the pressure of springs 11. The normal height of shoes 7 above the rails is, of course, less than the height of the rails above their supporting surface, the normal position of the shoe being calculated so that the operation of valves 14 may be effected when the shoes are moved upwardly relative to the truck bodies, as stated. Upon the relative upward movement of a shoe 7 as just described, the link 20 will be swung upwardly about its connection with link 19 as a pivot, until the upper end of bracket 21 comes into engagement with link 19, or some other stop is encountered to prevent further upward oscillation of link 20. The further relative upward movement of shoe 7, as the truck body comes down toward the rails, results in upward movement of the link 19 with the consequent oscillation of bell-crank 15 about its pivot with the consequent oscillation of the valve lever 18 and the total or partial operation of the valve.

It will be understood that our invention is not limited strictly to the form of device described, but is as broad as is indicated by the accompanying claims.

What we claim is:—

1. In a safety device, the combination of a car truck having wheels adapted to run on rails, a body and springs, a car supported on said springs, a train air pipe having a valve therein, a shoe carried below said truck body, normally extending over one of said rails, at a slight elevation above the same, and yieldable upwardly relatively to said truck, a bell-crank pivoted to said car, connections between said bell-crank and valve, and connections between said bell-crank and shoe for operating said valve when said shoe moves upwardly relatively to said truck body, said last named connections including a vertically disposed link pivotally connected to said bell-crank, an arm rigidly secured to said shoe and extending upwardly therefrom, and a short horizontally disposed link pivotally connected to the lower end of said first named link and the upper end of said arm, the upper end of said arm being arranged to abut against said first named link as a stop, upon any substantial upward movement of said short link about the lower end of said first link as a pivot.

2. In a safety device, the combination of a car truck having wheels adapted to run on rails, a body and springs, a car supported on said springs, a shoe carried below said truck body, normally over one of said rails, at a slight elevation above the same, and spring-pressed downwardly, a member pivoted to said car, and connections for oscillating said member when said member moves upwardly substantially, relatively to said truck, comprising a link pivoted to said member, and a short link pivoted to said first link, and pivotally connected at its opposite end to said shoe, said short link being arranged for a limited oscillation only relative to said first link and shoe.

This specification signed and witnessed this 9th day of June, 1919.

EDWARD E. SHEAR.
WILLIAM G. WAECHTLER.

Witnesses:
JASON E. CARLE,
FRANK B. MATTHEWS.